US010375843B2

(12) United States Patent
Boily

(10) Patent No.: US 10,375,843 B2
(45) Date of Patent: Aug. 6, 2019

(54) SWITCHGEAR EXHAUST ASSEMBLY

(71) Applicant: Automatisation Grimard Inc., Canton Tremblay (CA)

(72) Inventor: Hugo Boily, Chicoutimi (CA)

(73) Assignee: AUTOMATISATION GRIMARD INC., Canton Tremblay (CA)

(*) Notice: Subject to any disclaimer, the term of this patent is extended or adjusted under 35 U.S.C. 154(b) by 0 days.

(21) Appl. No.: 15/615,382

(22) Filed: Jun. 6, 2017

(65) Prior Publication Data

US 2018/0352667 A1    Dec. 6, 2018

(51) Int. Cl.
| | |
|---|---|
| H02B 13/00 | (2006.01) |
| H05K 5/02 | (2006.01) |
| H01H 9/34 | (2006.01) |
| H02B 13/045 | (2006.01) |
| H02B 13/025 | (2006.01) |
| H02B 1/56 | (2006.01) |

(52) U.S. Cl.
CPC .......... *H05K 5/0213* (2013.01); *H01H 9/342* (2013.01); *H02B 13/025* (2013.01); *H02B 13/045* (2013.01); *H02B 1/565* (2013.01)

(58) Field of Classification Search
None
See application file for complete search history.

(56) References Cited

U.S. PATENT DOCUMENTS

| | | | | |
|---|---|---|---|---|
| 6,407,331 | B1* | 6/2002 | Smith | .................. H02B 13/025 |
| | | | | 174/17 VA |
| 6,417,443 | B1* | 7/2002 | Smith | .................... H02B 1/565 |
| | | | | 174/17 VA |

(Continued)

FOREIGN PATENT DOCUMENTS

| | | |
|---|---|---|
| CA | 2882245 A1 | 2/2014 |
| CA | 2915098 A1 | 1/2015 |

(Continued)

OTHER PUBLICATIONS

ABB s.r.o., PPMV Brno, Medium Voltage Product, Unigear ZS1, Installation, Service and Maintenance Instruction Manual, 2010, 106 pages.

(Continued)

*Primary Examiner* — Courtney L Smith
(74) *Attorney, Agent, or Firm* — McDonnell Boehnen Hulbert & Berghoff LLP

(57) ABSTRACT

A switchgear exhaust assembly for controlling flow of exhaust from exhaust ports of a switchgear has an enclosure that is couplable to the switchgear to substantially enclose the exhaust ports. The enclosure defines a primary exhaust chamber for receiving exhaust flowing through the exhaust ports and allowing gases of the exhaust to expand and cool down. A top wall of the enclosure has a top layer and a bottom layer defining at least one secondary exhaust chamber. The bottom layer has openings whereby exhaust in the primary exhaust chamber flows to the secondary exhaust chamber. The top and bottom layers further define one or more side openings that provide fluid communication between the secondary exhaust chamber and a space surrounding the enclosure, thereby allowing exhaust to be expelled into the space.

19 Claims, 11 Drawing Sheets

(56) References Cited

U.S. PATENT DOCUMENTS

| | | | |
|---|---|---|---|
| 7,586,738 B1* | 9/2009 | Hartzel | H02B 1/56 361/676 |
| 8,451,589 B2 | 5/2013 | Milovac et al. | |
| 8,537,539 B2* | 9/2013 | Doll | H05K 7/20736 361/679.5 |
| 8,628,158 B2* | 1/2014 | Caveney | H05K 7/20745 312/204 |
| 8,785,770 B2* | 7/2014 | Gingrich | H02B 1/565 174/17 VA |
| 9,531,168 B2* | 12/2016 | Bugaris | H02B 13/025 |
| 2006/0050470 A1* | 3/2006 | Eiselt | H02B 13/025 361/605 |
| 2006/0185931 A1* | 8/2006 | Kawar | G06F 1/18 181/202 |
| 2009/0141432 A1* | 6/2009 | Kingston | H02B 13/02 361/676 |
| 2009/0185333 A1* | 7/2009 | Coomer | H02B 13/025 361/622 |
| 2011/0292575 A1 | 12/2011 | Franco | |
| 2014/0118887 A1* | 5/2014 | Deb | H02B 13/025 361/622 |
| 2014/0131090 A1* | 5/2014 | Gingrich | H02B 1/565 174/560 |
| 2015/0036310 A1* | 2/2015 | Karandikar | H02B 13/025 361/837 |
| 2016/0242315 A1* | 8/2016 | Pawar | H02B 1/56 |
| 2017/0098924 A1* | 4/2017 | Trussler | H02B 1/565 |

FOREIGN PATENT DOCUMENTS

| | | |
|---|---|---|
| CN | 201590606 U | 9/2010 |
| IN | 2011CH01842 A | 12/2012 |
| WO | 2012143236 A1 | 10/2012 |

OTHER PUBLICATIONS

Canadian Intellectual Property Office, Examiner's Report for corresponding Canadian application No. 2,969,681, dated Nov. 6, 2017, 6 pages.
Canadian Intellectual Property Office, Examiner's Report for corresponding Canadian application No. 2,969,681, dated Mar. 7, 2018, 6 pages.
Canadian Intellectual Property Office, Examiner's Report for corresponding Canadian Application No. 2,969,681, dated Jun. 21, 2018 (5 pages).
Canadian Intellectual Property Office, Examiner's Report for corresponding Canadian application No. 2,969,681, dated Feb. 26, 2019, 4 pages.

* cited by examiner

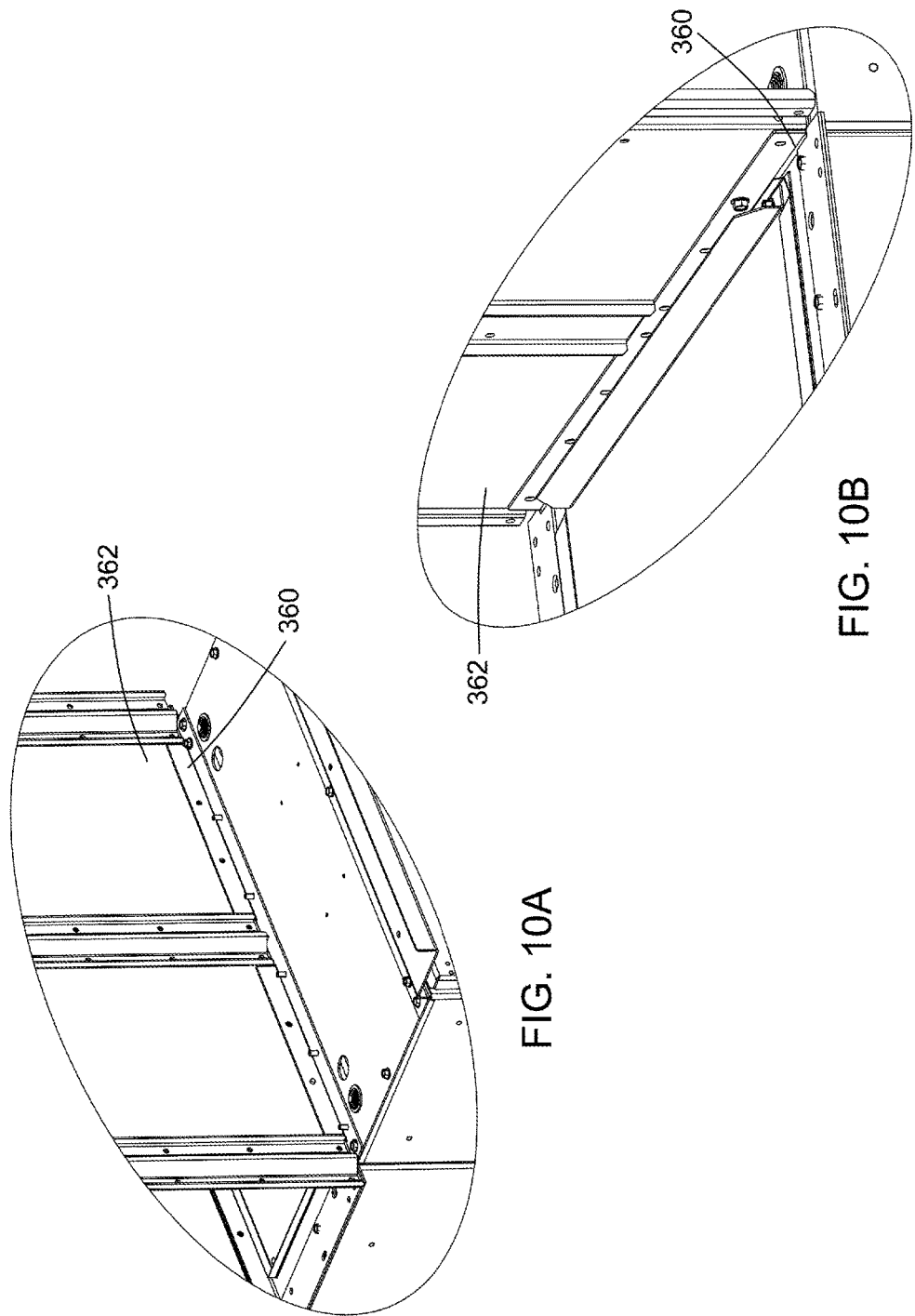

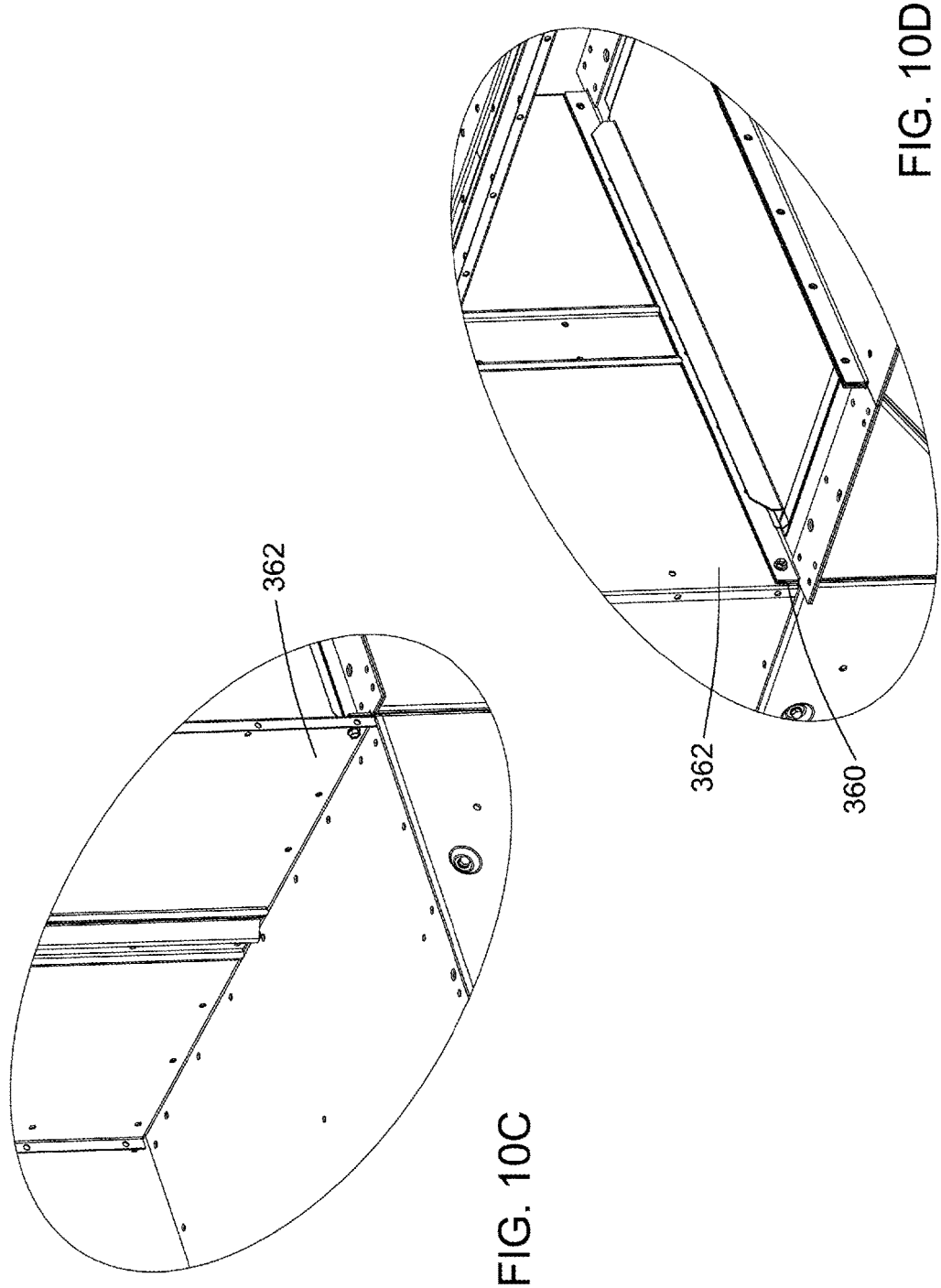

SWITCHGEAR EXHAUST ASSEMBLY

TECHNICAL FIELD

The present disclosure generally relates to a switchgear exhaust assembly and method of controlling flow of exhaust from a switchgear, and more particularly, to a switchgear exhaust assembly and a method that may be useable in spaces having a low ceiling.

BACKGROUND

Various types of electrical equipment, such arc resistant switchgears, are usually designed to withstand the pressures and temperatures of gases associated with an internal arcing fault. Enclosures of such equipment are designed to direct pressure and hot arc byproducts away from human personnel.

The occurrence of arcing inside electrical switchgears has many undesirable results. Conductors and arc surrounding material are vaporized and converted to plasma by the arc energy during the event. The massive rate of expansion of the plasma causes a sudden pressure increase inside the enclosure of the switchgear, resulting in severe mechanical and thermal stress on the equipment and its components. As a result of the high pressures generated, door/cover, hinges and latching means of the equipment are placed under significant stress. If the door/cover, hinges and latching means should yield and/or deform, personnel in vicinity of the equipment would be exposed to dangerous levels of energy. In other words, the ionized gases associated with arcing faults may be released at pressures and temperatures sufficient to damage the switchgear equipment and potentially cause deadly harm to anyone in close proximity.

A commonly employed method for improving the enclosures of a switchgear in the event of arcing faults is to provide arc-resistant switchgears that meets switchgear standards, with a means for venting gases from the compartment in which an arcing fault occurs. These compartments are designed to withstand the pressures and temperatures of the gases associated with an arcing fault and reduce the likelihood or extent of damage to the switchgear.

Other prior art solutions include exhaust chambers or plenums which channel exhaust products such as hot gases, debris, and metal parts away from the room where the arcing electrical equipment and handling personnel are located. Usually a plenum assembly is provided on top of the switchgear so that the hot gases flow out through the plenum and further through a duct to a space outside the building.

SUMMARY

According to one aspect, there is provided a switchgear exhaust assembly for controlling flow of exhaust from one or more exhaust ports of a switchgear. The assembly includes an enclosure having a plurality of walls having a top wall, the enclosure being couplable to the switchgear to substantially enclose the one or more exhaust ports of the switchgear, the enclosure defining a primary exhaust chamber for receiving exhaust flowing through the exhaust ports and allowing gases of the exhaust to expand and cool down, the top wall having a top layer and a bottom layer defining at least one secondary exhaust chamber therebetween, the bottom layer of the top wall comprising first openings providing fluid communication between the primary exhaust chamber and the secondary exhaust chamber, the top layer and the bottom layer of the top wall defining one or more side openings therebetween, the side openings providing fluid communication between the secondary exhaust chamber and a space surrounding the enclosure, allowing gases to be expelled into said space.

According to another aspect, there is provided switchgear exhaust assembly for controlling flow of exhaust from one or more exhaust ports of a switchgear. The assembly includes a plurality of U-shaped elements each having opposing first and second sidewall members and a panel assembly extending therebetween, the plurality of U-shaped elements being aligned whereby the first sidewall members form a first lateral sidewall, the second sidewall members form a second lateral sidewall, and the panel assemblies form a top wall; a pair of opposing end sidewalls defining with the first lateral sidewall, the second lateral sidewall and the top wall a primary exhaust chamber for receiving exhaust flowing through the exhaust ports and allowing gases to expand and cool down, the panel assembly of one or more of the U-shaped elements each having a top layer and a bottom layer defining a respective secondary exhaust chamber therebetween, the bottom layer of the panel assembly comprising first openings providing fluid communication between the primary exhaust chamber and the respective secondary exhaust chambers, and the top layer and the bottom layer of the panel assembly defining one or more side openings therebetween, for providing fluid communication between the respective secondary exhaust chamber and a space surrounding the enclosure, allowing gases to be expelled into said space.

According to yet another aspect, there is provided a method for controlling flow of exhaust from one or more exhaust ports of a switchgear. The method includes capturing exhaust flowing from the switchgear through the exhaust ports within a primary exhaust chamber of an enclosure, the exhaust expanding and being cooled in the primary exhaust chamber; channeling a portion of the exhaust to a secondary exhaust chamber of the enclosure, the secondary exhaust chamber being positioned above the primary exhaust chamber and being in fluid communication therewith; and expelling the portion of the exhaust via side openings of the secondary exhaust chamber to a space surrounding the enclosure.

According to some embodiments, the one or more side openings are defined along at least one edge of one of the top and bottom layers of the top wall.

According to some embodiments, the top layer of the top wall is substantially free of openings therein.

According to some embodiments, the first openings of the bottom layer are located remotely of the one or more side openings.

According to some embodiments, the switchgear exhaust assembly includes a plurality of framing elements supporting the enclosure, for reinforcing the enclosure.

According to some embodiments, the plurality of walls of the enclosure comprises opposing lateral sidewalls and opposing end sidewalls, and the enclosure comprises at least one U-shaped element having opposing first and second sidewall members and a panel assembly extending therebetween, the first and second sidewall members corresponding to portions of the lateral sidewalls of the enclosure and the panel assembly corresponding to a portion of the top wall.

According to some embodiments, the panel assembly comprises a top panel having at least one first rim extending downwardly and a bottom panel having at least one second rim extending upwardly and facing said at least one first rim, the one or more side openings of the top wall being defined between said at least one first and second rims.

According to some embodiments, the switchgear exhaust assembly includes a plurality of spacing elements extending between the top and bottom panels of the panel assembly, for maintaining a space between the top and bottom panels and providing the secondary exhaust chamber therebetween.

According to some embodiments, the panel assembly comprises at least one perforated panel having a plurality of perforations corresponding to the first openings of the top wall, said at least one perforated panel being supported by the bottom panel.

According to some embodiments, the panel assembly further comprises a top wall member extending between the opposing first and second sidewall members of the U-shaped element and supporting at least one of the top and bottom panels and the top panel corresponds to a portion of the top layer of the top wall and wherein the bottom panel, the perforated panel and the top sidewall of the U-shaped member correspond to a portion of the bottom layer of the top wall.

According to some embodiments, the end sidewalls comprises at least one end wall reinforcing element, for reinforcing the end sidewalls.

According to some embodiments, the enclosure comprises a plurality of aligned U-shaped members being aligned, the first sidewall members forming a first of the lateral sidewalls and the second sidewall members forming a second of the lateral sidewalls.

According to some embodiments, the switchgear exhaust assembly includes at least one framing element each being positioned between a pair of adjacent U-shaped members, for reinforcing the pair of adjacent U-shaped members.

According to some embodiments, the framing element further comprises at least one frame reinforcing element.

According to some embodiments, the panel assembly of the one or more of the U-shaped elements each comprises a top panel having at least one first rim extending downwardly and a bottom panel having at least one second rim extending upwardly and facing said at least one first rim, the one or more side openings of the top wall being defined between said at least one first and second rims and a plurality of spacing elements extending between the top and bottom panels of the panel assembly, for maintaining a space between the top and bottom panels and providing the secondary exhaust chamber therebetween.

According to some embodiments, the panel assembly of the one or more of the U-shaped elements each comprises at least one perforated panel having a plurality of perforations corresponding to the first openings of the top wall, said at least one perforated panel being supported by the bottom panel, a top wall member extending between the opposing first and second sidewall members of the U-shaped element and supporting at least the top and bottom panels, and the top panel corresponds to a portion of the top layer of the top wall and wherein the bottom panel, the perforated panel and the top wall of the U-shaped member correspond to a portion of the bottom layer of the top wall.

According to some embodiments, the switch gear exhaust assembly includes at least one framing element each being positioned between a pair of adjacent U-shaped members, for reinforcing the pair of adjacent U-shaped members and the end sidewalls comprise at least one end wall reinforcing element, for reinforcing the end sidewalls.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIGS. 10A, 10B, 10C and 10D illustrate close-up view of the interfacing between switchgear exhaust assembly and a switchgear.

Figure 1:
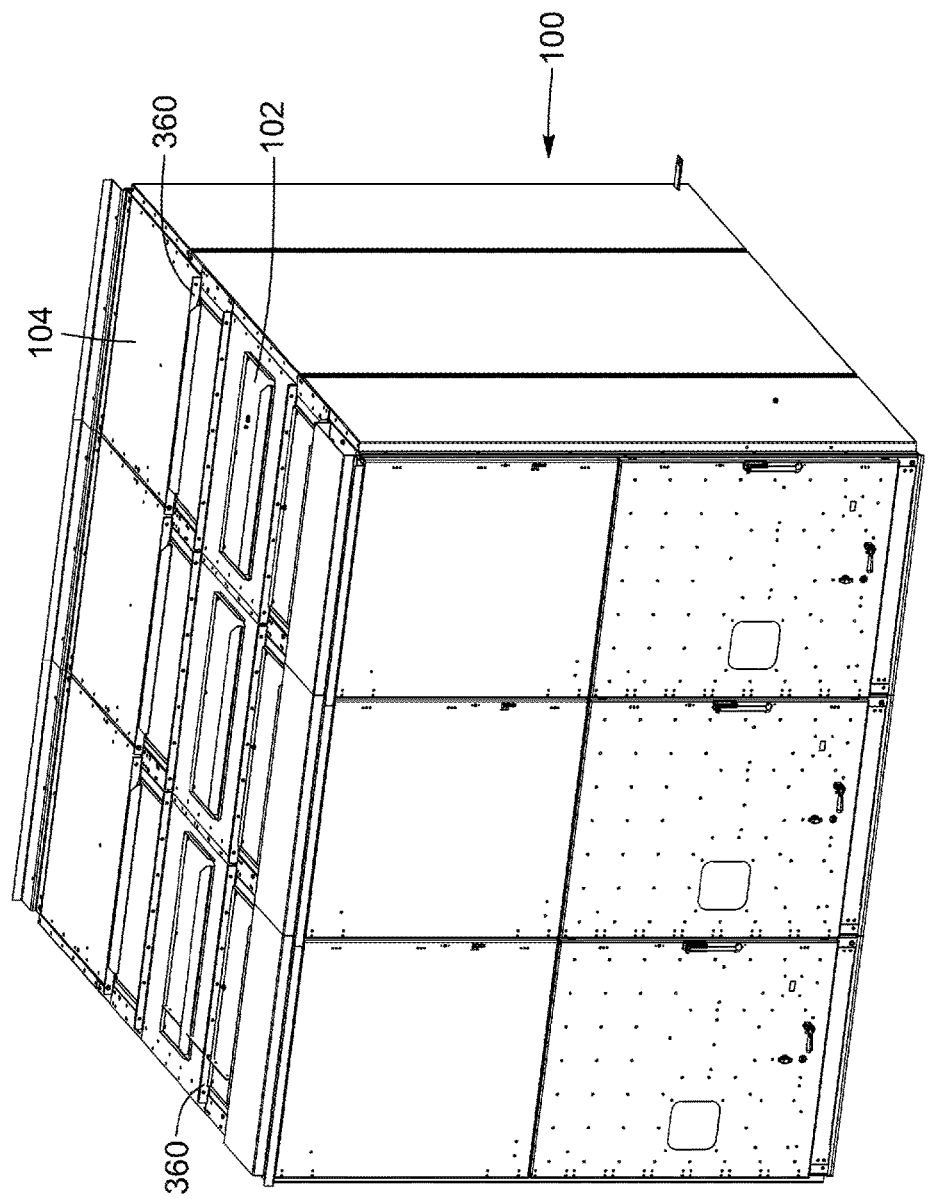
FIG. 1 illustrates a perspective view of a switchgear commonly used in the art.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

Referring now to FIG. 1, therein illustrated is a perspective view of a switchgear 100 commonly used in the art. The switchgear 100 has a housing that houses inside it a combination of electrical components, such as electrical switches, fuses, circuit breakers, etc. As described elsewhere herein, arcing may occur inside the electrical switchgear. Exhaust ports 102 are provided in the housing of the switchgear 100 to allow venting of exhaust from the inside of the housing. Often, the exhaust ports are provided as pressure release flaps.

Exhaust herein refer to matter (ex: gases, flames, smoke, etc.) that is vented from the inside of the switchgear in situations where an arcing fault occurs. The exhaust gases may have high pressure. Pressure levels within a switchgear were measured experimentally at approximately 80 kPa (12 Psi), but it is possible that in some areas, such as near corners of the switchgear 100, the pressure level may reach over 30 Psi. Without being tied to a particular theory, such high levels of pressure may result from waves of exhaust gases being additive in the corners of the switchgear 100.

As is known in the art, the exhaust ports 102 may include pressure release flaps, which are actuated to allow the exit of the exhaust gas under pressure, but are otherwise in a position to close the exhaust ports. In the illustrated switchgear 100, the exhaust ports 102 are located on a top wall 104 of the switchgear 100.

Figure 2:
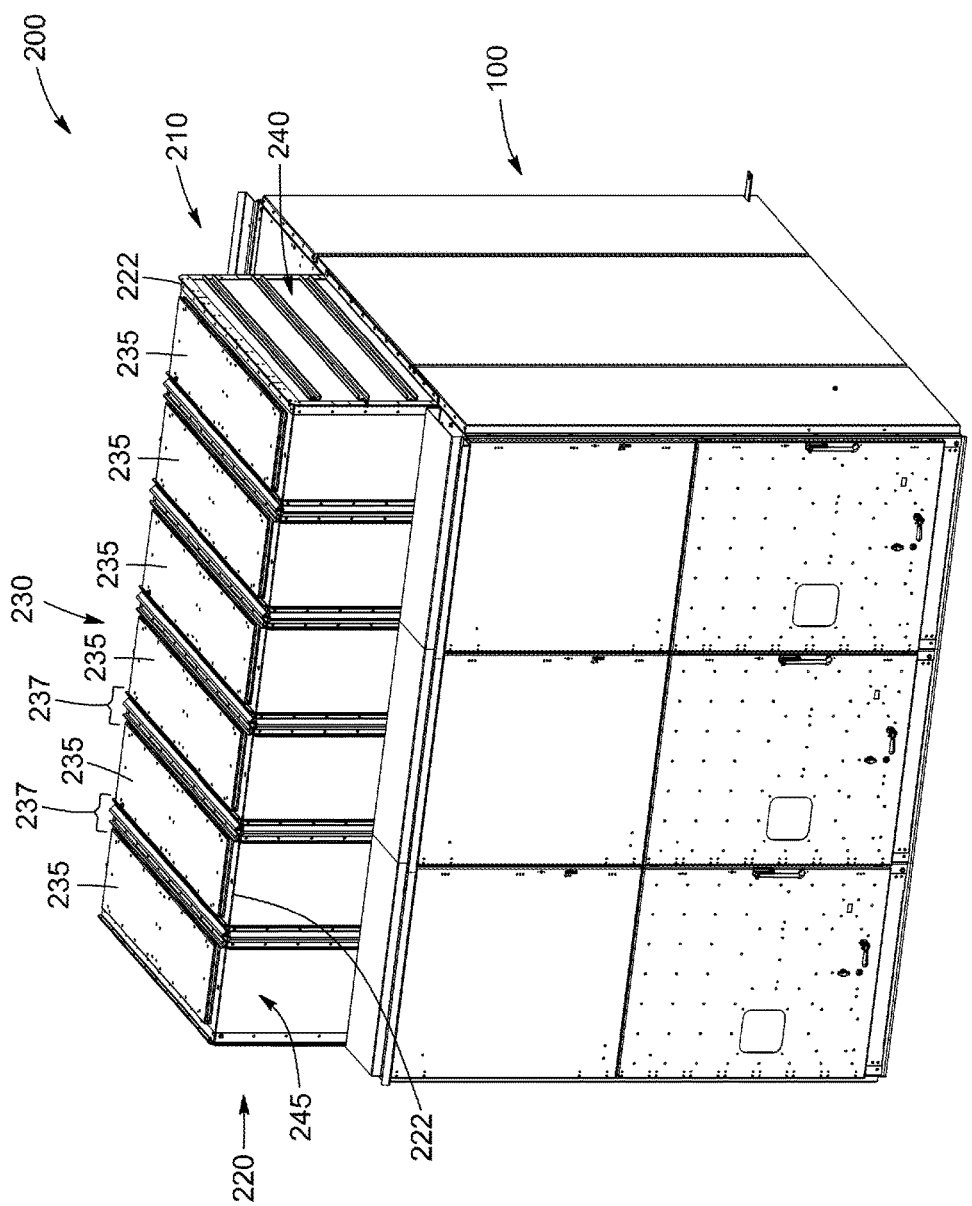
FIG. 2 illustrates a perspective of a switchgear having installed thereon a switchgear exhaust assembly according to one example embodiment.

Referring now to FIG. 2, therein illustrated is a perspective view of a switchgear 100 onto which a switchgear exhaust assembly 200 according to an example embodiment has been installed. The switchgear exhaust assembly 200 acts to control the flow of exhaust emitted from the exhaust ports 102 of the switchgear 100.

The switchgear exhaust assembly 200 includes an enclosure 210 that is adapted to be coupled to the switchgear so as to substantially enclose the one or more exhaust ports 102 of the switchgear 100. By substantially enclosing the exhaust port 102, it is meant that the enclosure defines a substantially closed chamber and that the inside of the switchgear 100 is in fluid communication with the closed chamber via the exhaust ports 102. The chamber is substantially closed in that the inside of the chamber is in communication with the space outside the enclosure 210 through specific openings only (ex: side openings 236) provided in the enclosure 210, as described elsewhere herein.

The enclosure 210 defines a primary exhaust chamber 250 for receiving exhaust flowing through the exhaust ports 102, when an arcing fault has occurred. Exhaust exiting the switchgear 100 through the exhaust ports 102, is directly received within the primary exhaust chamber 250, i.e. it does not flow through any intermediate chambers or surfaces. The primary exhaust chamber 250 is sufficiently sized and the enclosure 210 is sufficiently rigid to allow gases of the exhaust to at least partially expand and cool down within the primary exhaust chamber 250.

Figure 3:
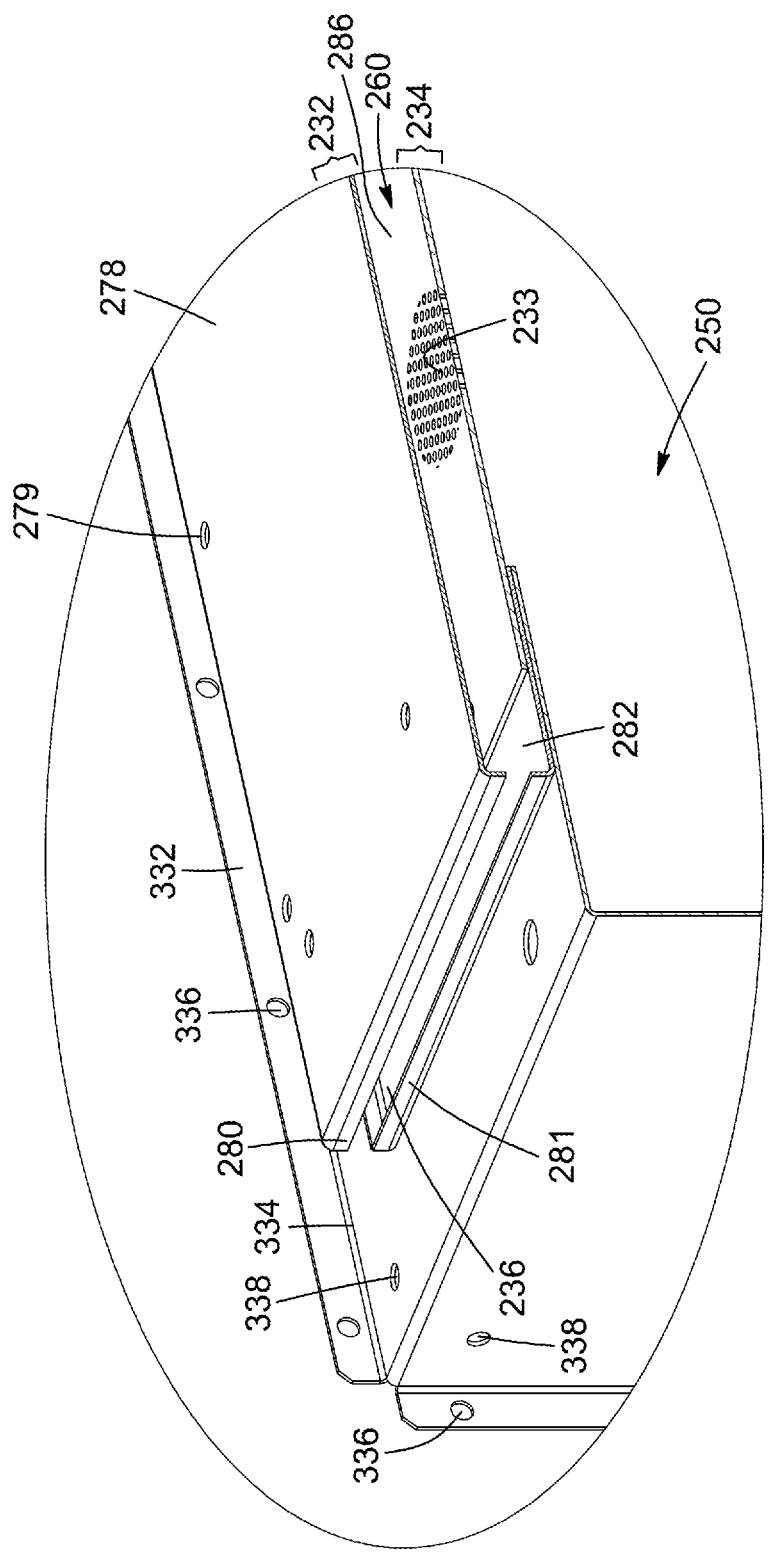
FIG. 3 illustrates a partial cutaway view of the portion of the top wall of an enclosure according to an embodiment.

The enclosure 210 may include a plurality of walls, which define together the primary exhaust chamber 250. One of the walls is a top wall 230. FIG. 3 illustrates a partial cutaway view of a portion of the top wall 230 according to an embodiment. The top wall 230 includes a top layer 232 and a bottom layer 234. The bottom layer 234 defines with other walls of the enclosure 210 the primary exhaust chamber 250 of the enclosure 210. The top layer 232 is spaced apart from the bottom layer 234 to define at least one secondary exhaust chamber 260 therebetween. In some embodiments, the space between the top layer 232 and bottom layer 234, corresponding to a height of the second exhaust chamber 260, is less than approximately 5 cm.

For example, the height of the second exhaust chamber 260 may be less than 3 cm.

For example, the height of the second exhaust chamber 260 may be about 26 mm.

The bottom layer 234, which may be formed of a plurality of sub-layers or a plurality of panel members forms a boundary between the primary exhaust chamber 250 and the secondary exhaust chamber 260. It will be appreciated that since the top wall 230 is positioned at the top of the enclosure 210, the secondary exhaust chamber 260 is positioned above the primary exhaust chamber 250.

The bottom layer 234 further includes a plurality of first openings 233 formed therein. The first openings 233 may correspond to perforations in the bottom layer 234. Alternatively, the bottom layer 234 may be a filter member or a mesh members having the first openings 233 formed therein.

The first openings 233 provide fluid communication between the primary exhaust chamber 250 and the secondary exhaust chamber 260.

As exhaust is received within the primary exhaust chamber from occurrence of an arc fault, a portion of the exhaust flows through the first openings 233 of the bottom layer 234 into the secondary exhaust chamber 260. Furthermore, contact of the exhaust with the surfaces of the first openings 233 of the bottom layer 234 causes heat transfer from the exhaust to the bottom layer 234, which further cools the portion of the exhaust received within the secondary exhaust chamber 260.

In addition to gases, the exhaust may also include solid fragments, which be components of the switchgear 100 that are broken off during a failure. Providing first openings 233 in the bottom layer 234 allow gases to enter the secondary exhaust chamber 260 while these solid fragments are captured by the bottom layer 234. This restricts such solid fragments from exiting the switchgear exhaust assembly 200 and possibly injuring nearby operators.

The exhaust may also include heated particulate materials, which may have the appearance of a glowing powder. The bottom layer 234 also contributes to capturing these heated particular materials and restricts the exiting of the materials from the switchgear exhaust assembly 200.

The top layer 232 and the bottom layer 234 further define one or more side openings 236 therebetween. These side openings 236 provide fluid communication between the secondary exhaust chamber 260 and a space surrounding (and being outside of) the enclosure 210. Accordingly, the portion of the exhaust that flows into the secondary exhaust chamber 260 from the primary exhaust chamber 250 is further expelled into the space surrounding the enclosure 210. In some embodiments, the height of the side openings 236 may be less than approximately 2 cm. For example, the height of the side openings 236 may be about 11 mm.

The side openings 236 are oriented sideways with respect to the top layer 232 such that exhaust is expelled in a substantially sideway direction from the secondary exhaust chamber 260. In one example embodiment, the side openings 236 extend along one or more edges of one of the top layer 232 and the bottom layer 234. For example, and as illustrated in FIG. 3, a first rim 280 extends downwardly from an edge of the top layer 232. A second rim 281 extends upwardly from the bottom layer 234 towards the first layer 232. One or more of the side openings 236 are defined between the edges of the first and second rims 280 and 281.

The top layer 232 of the top wall 230 may be substantially free of any openings. Accordingly, the topmost surface of the enclosure 210, when appropriately coupled to the switchgear 100, is substantially closed. This closed property in combination with side openings 236 being oriented sideways, restricts the expulsion of exhaust to a substantially sideways direction from the secondary exhaust chamber 260 into the space surrounding the enclosure 210. Accordingly, flow of exhaust upwardly of the switchgear exhaust assembly 200 is significantly reduced.

According to one example embodiment, the first openings 233 formed in the bottom layer 234 are located remotely of the side openings 236. For example, a portion of the bottom layer 234 located near the side openings 236 is free of any first openings 233. Accordingly, when a portion of exhaust is received within the secondary exhaust chamber 260 through the first openings 233, the exhaust flows over a portion of the length of the secondary exhaust chamber 260 (ex: in a direction parallel to the top and bottom layers 232, 234) before reaching side openings 236 and being expelled from the secondary exhaust chamber 260. This flow of the exhaust can further reduce the temperature/energy (ex: from transfer of temperature/energy to the top layer 232). This flow of the exhaust also has the effect of reducing the speed of the flow of exhaust.

The switchgear exhaust assembly 200 may further include a plurality of framing elements 290 for reinforcing the enclosure 210. It was observed that exhaust expelled through the exhaust ports 102 of the switchgear 100 and received within primary exhaust chamber 250 can have significantly high pressure levels, which can exert a significant force on the walls of the enclosure 210, and can cause warping of the walls. The framing elements 290 support the walls of the enclosure 210 and provide reinforcement to the enclosure 210. The framing elements 290 may extend over an outer surface of one or more walls of the enclosure 210 to provide reinforcement thereto. In another embodiment, the framing elements 290 may be fixed to an inner surface of one or more walls of the enclosure 210 to provide reinforcement thereto. In yet another embodiment, the framing elements 290 may form part of the walls of the enclosure 210, such as being attached to other portions of the walls.

According to one example embodiment, and as illustrated in FIG. 2, the switchgear exhaust assembly 200 may include a plurality of a top wall segments 235 being distributed over the top wall 230. Each top wall segment 235 defines a respective secondary exhaust chamber 260 and respective side openings 236 thereof. For example, and as illustrated, each top wall segment 235 is spaced apart from an adjacent top wall segment 235 to define a discontinuity 237 therebetween. The side openings of a given top wall segment 235 may extend along the entire perimeter of the edge of that top wall segment 235. It will be appreciated that providing a plurality of top wall segments 235, the number of side openings 236 and overall area defined by the side openings 236, for allowing expelling of exhaust from the secondary exhaust chambers in the sideways direction, is also increased.

As described elsewhere herein, the enclosure 210 includes a plurality of walls that define together the primary exhaust chamber 250. For example, and as illustrated in FIG. 2, the switch gear assembly 200 is configured to be positioned over a top wall 104 of the switchgear 100 that has its exhaust ports 102 positioned on the top wall 104. Exhaust expelled upwardly from the exhaust ports 102 from the switchgear 100 is captured within the primary exhaust chamber 250.

According to one example embodiment, and as illustrated in FIG. 2, the enclosure 210 includes of a plurality of sidewalls 220 and the top wall 230 extending between upper edges 222 of the sidewalls 220. As further illustrated, the sidewalls 220 define an upper rectangular perimeter that corresponds to a perimeter of the top wall 104 and the sidewalls 220 include opposing lateral sidewalls 245 and opposing end sidewalls 240.

In the example illustrated in FIG. 2, the framing elements 290 extend upwardly along the lateral sidewalls 245 and in a sideway direction along the top wall 230 of the enclosure 210. A plurality of framing elements 290 may be distributed along the length of the lateral sidewalls 245. For example, the positioning of the framing elements 290 corresponds to the locations of the discontinuities 237 between adjacent top wall segments 235.

While the switchgear exhaust assembly 200 is illustrated in FIG. 2 as being configured for being position atop a switchgear 100, it will be understood that in other example embodiments, the switchgear exhaust assembly 200 may also be coupled to a side of a switchgear 100 (ex: where the exhaust ports are located on a side of the switchgear 100). Accordingly, the walls of the enclosure 210 of the switchgear exhaust assembly 200 can include a plurality of sidewalls, a bottom wall and the top wall 230. The top wall 230 of these other embodiments also include the top layer 232 and the bottom layer 234 that define the secondary exhaust chamber 260. The first openings 233 are formed in the bottom layer 234 and provide fluid communication between the primary exhaust chamber 250 and the secondary exhaust chamber 260. The top layer 232 and the bottom layer 234 also define the side openings 236 oriented in the sideways direction of the enclosure 210. The side openings 236 may be positioned at a height that is higher than the top wall of the switchgear 100, which can allow exhaust to be expelled in all directions from the secondary exhaust chamber 260. It will be understood that the configuration of the top wall 230 is the same as the top wall 230 described herein with reference to the switchgear exhaust assembly 200 configured to be positioned atop the switchgear 100.

Figure 4:
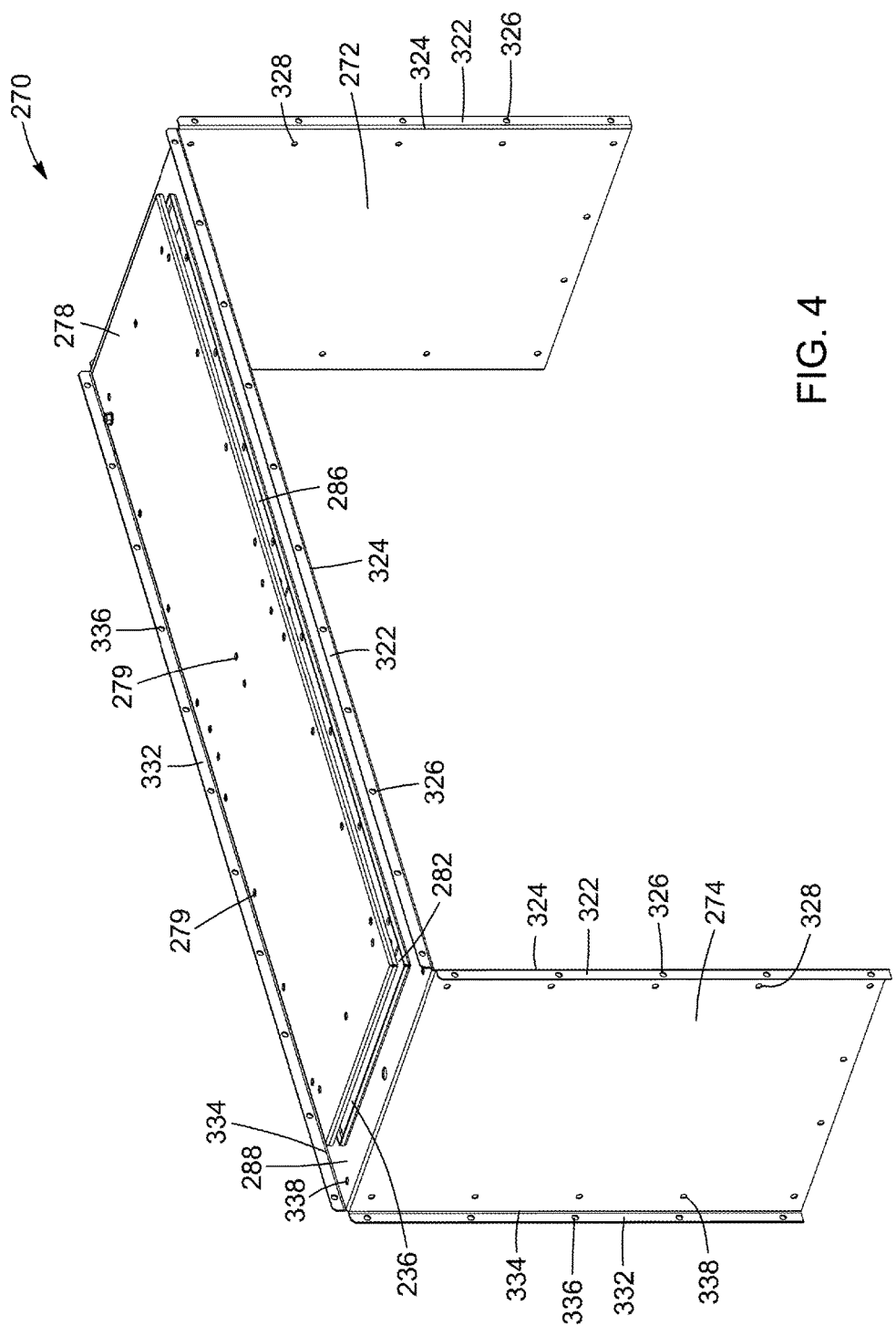
FIG. 4 illustrates a perspective view of a U-shaped element for forming the enclosure according to an example embodiment.

Referring now to FIG. 4, therein illustrated is a U-shaped element 270 for forming the enclosure 210 according to an example embodiment. It will be understood that the illustrated U-shaped element 270 is for use with the switchgear exhaust assembly 100 configured for being coupled atop a switchgear 100.

The U-shaped element 270 includes a first sidewall member 272 and a second side wall member 274 positioned opposite one another. The first sidewall member 274 forms a portion of a first lateral sidewall 245 of the enclosure 210 and the second sidewall member 274 forms a portion of a second lateral sidewall 245 of the enclosure 210. Each of the first sidewall member 272 and the second sidewall member 274 may be formed of a panel member formed of suitable metallic material, such as steel. A panel assembly 276 extends between a top edge of the first sidewall member 272 and a top edge of the second sidewall member 274. The panel assembly 276 corresponds to a portion of the top wall 232 of the enclosure 210.

Figure 5:
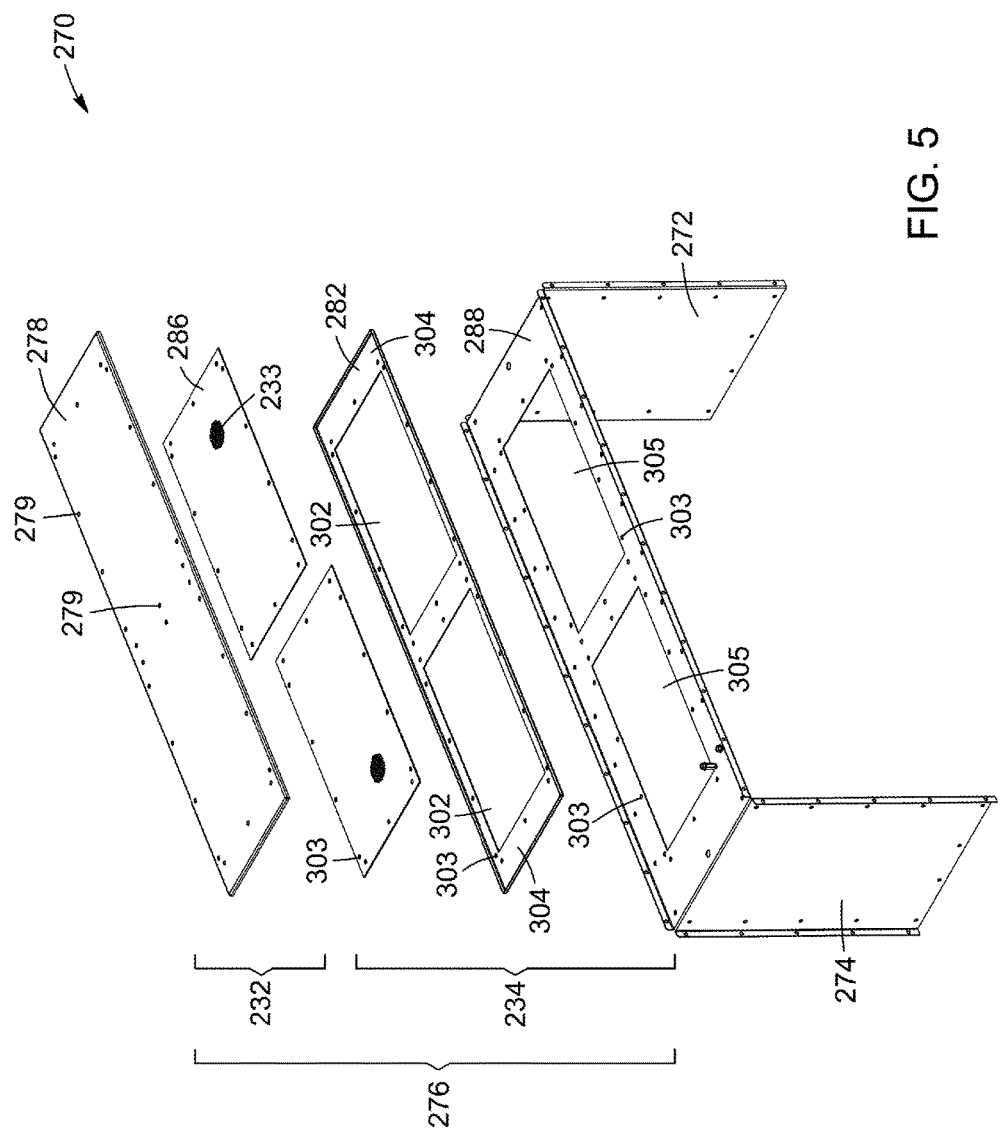
FIG. 5 illustrates an exploded view of the U-shaped element according to an example embodiment.

The panel assembly 276 includes a plurality of panels that together form the top layer 232 and bottom layer 234 of the top wall 230 of the enclosure 210. Referring now to FIG. 5, therein illustrated is an exploded view of the U-shaped element 270 showing the various panels of the panel assembly 276.

The panel assembly 276 includes a top panel 278, which may be the top-most panel of the panel assembly 276. The top panel 278 is substantially free of openings that allow of flow of exhaust therethrough. However, and as illustrated, the top panel 278 may include fastener openings for receiving fasteners for fastening to other panels of the panel assembly 276. The top panel 278 of the panel assembly 276 corresponds to the top layer 232 of a portion of the top wall 230. For example, the top panel 278 may correspond to the top layer of one top wall segment 235. As illustrated in FIGS. 3 and 4, the top panel 278 includes the first rim 280 extending downwardly from one or more edges of the top panel 278. For example, and as illustrated in FIG. 4, the rim 280 may extend downwardly from each of the four edges of the top panel 278.

Continuing with FIG. 5, the panel assembly 276 includes at least one perforated panel 286, a bottom panel 282 and a top wall member 288. Each of these panels may be formed of a panel member formed of suitable metallic material, such as steel. The perforated panel 286 has a plurality of openings formed therein, which correspond to the first openings 233 of the bottom layer 234 of the top wall 230.

The bottom panel 282 includes one or more central open portions 302 that are aligned with the openings 233 of the at least one perforated panel 286. The bottom panel 282 further includes contiguous portions 304 surrounding the central open portions 302 that engage the bottom panel 282 to support it. As illustrated in FIGS. 3 and 4, the bottom panel 278 includes the second rim 281 extending upwardly from one or more edges of the bottom panel 282. For example, and as illustrated in FIG. 4, the second rim 281 may extend upwardly from each of the four edges of the bottom panel 282.

The top wall member 288 extends between the first sidewall member 272 and second sidewall member 274 of the U-shaped element 270. In one example embodiment, and as illustrated, the first sidewall member 272, the second sidewall member 274 and the top wall member 288 may be integrally formed. For example, the first and second sidewall members 272, 274 and the top wall member 288 may be formed of a single metallic panel being folded. The top wall member also includes one or more central open portions 305 that are aligned with the openings 233 of the at least one perforated panel 286.

Each of the perforated panel 286, bottom panel 282 and the top wall member 288 have a plurality fastener openings 303 formed therein. These fastener openings may be mutually aligned and may be further aligned with fastener openings 279 of the top panel 278. Accordingly, a plurality of fasteners received in the fastener openings of the perforated panel 286, bottom panel 282 and top wall member 288 can be used to fasten the perforated panel 286, bottom panel 282 and the top wall member 288 together to form the portion of the top wall. It will be appreciated that while the top panel corresponds to a portion of the top layer 232 of the top wall 230, the perforated panel 286, the bottom panel 282 and top wall member 288 correspond to a portion of the bottom layer 234 of the top wall 230. For example, the perforated panel 286, the bottom panel 282 and top wall member 288 may form the bottom layer of one of the top wall segments 235.

Figure 6:
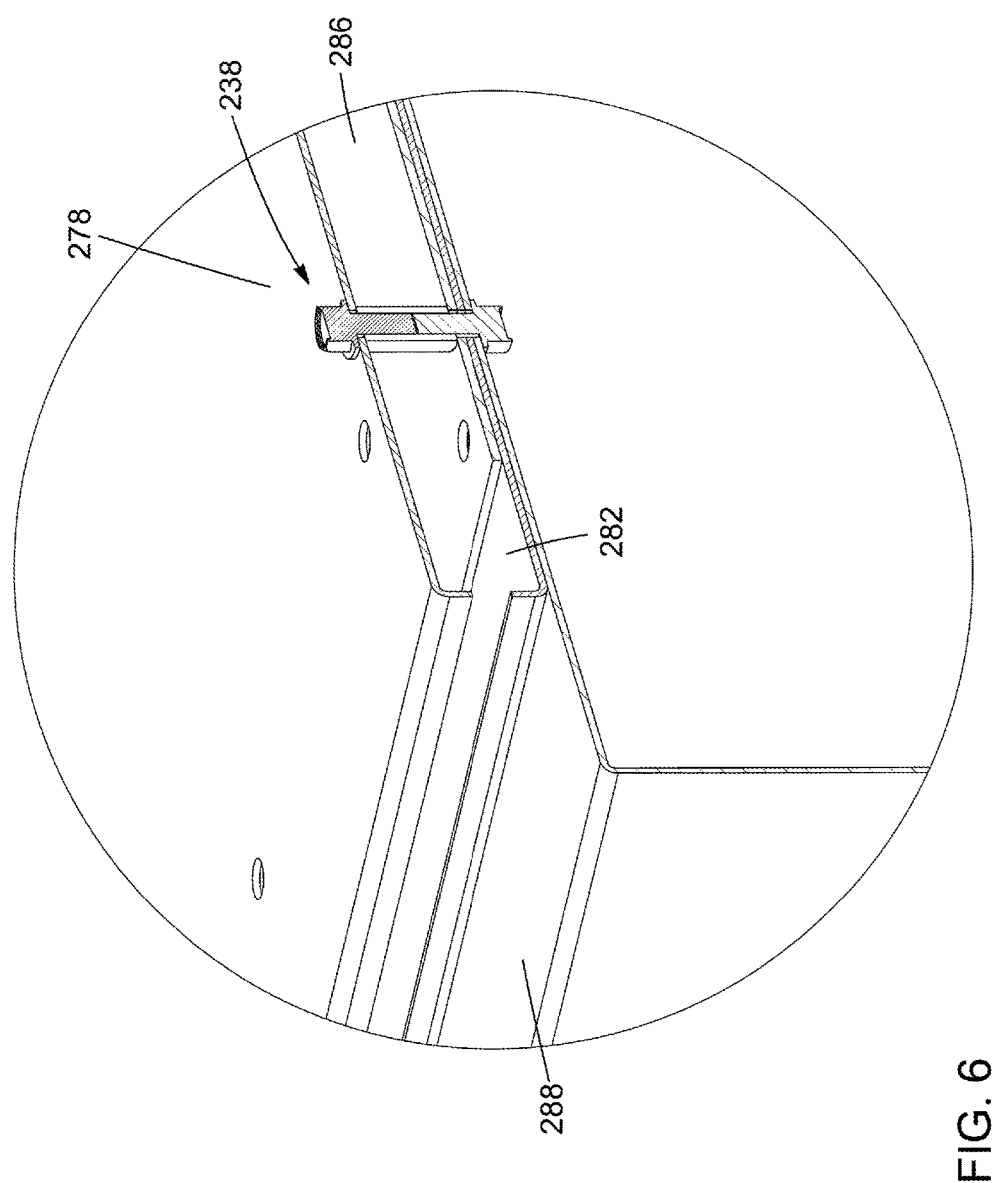
FIG. 6 illustrates a close-up partial cutaway view of a panel assembly according to an example embodiment.

Referring now to FIG. 6, therein illustrated is a close-up partial cutaway view of the panel assembly 276 showing a fastener element 238 being received in mutually aligned fastening openings of the top panel 278, perforated panel 286, bottom panel 282 and top wall member 288. The fastener element 238 also acts as a spacing element to ensure that the top layer 232 is spaced apart from the bottom layer 234. For example, the fastener element 238 may be a female threaded standoff with a bolt on each side. However, it will be understood that any other suitable fastener element 238 providing the spacing may be used, such as tube spacer with nut and bolt.

Advantageously, it was observed that illustrated panel assembly 276 provided adequate performance while also providing ease of construction. However, it will be understood that the panel assembly 276 illustrated in various figures herein is shown and described herein for example purposes, and that other configurations of the top wall 232 may be possible.

Figure 7:
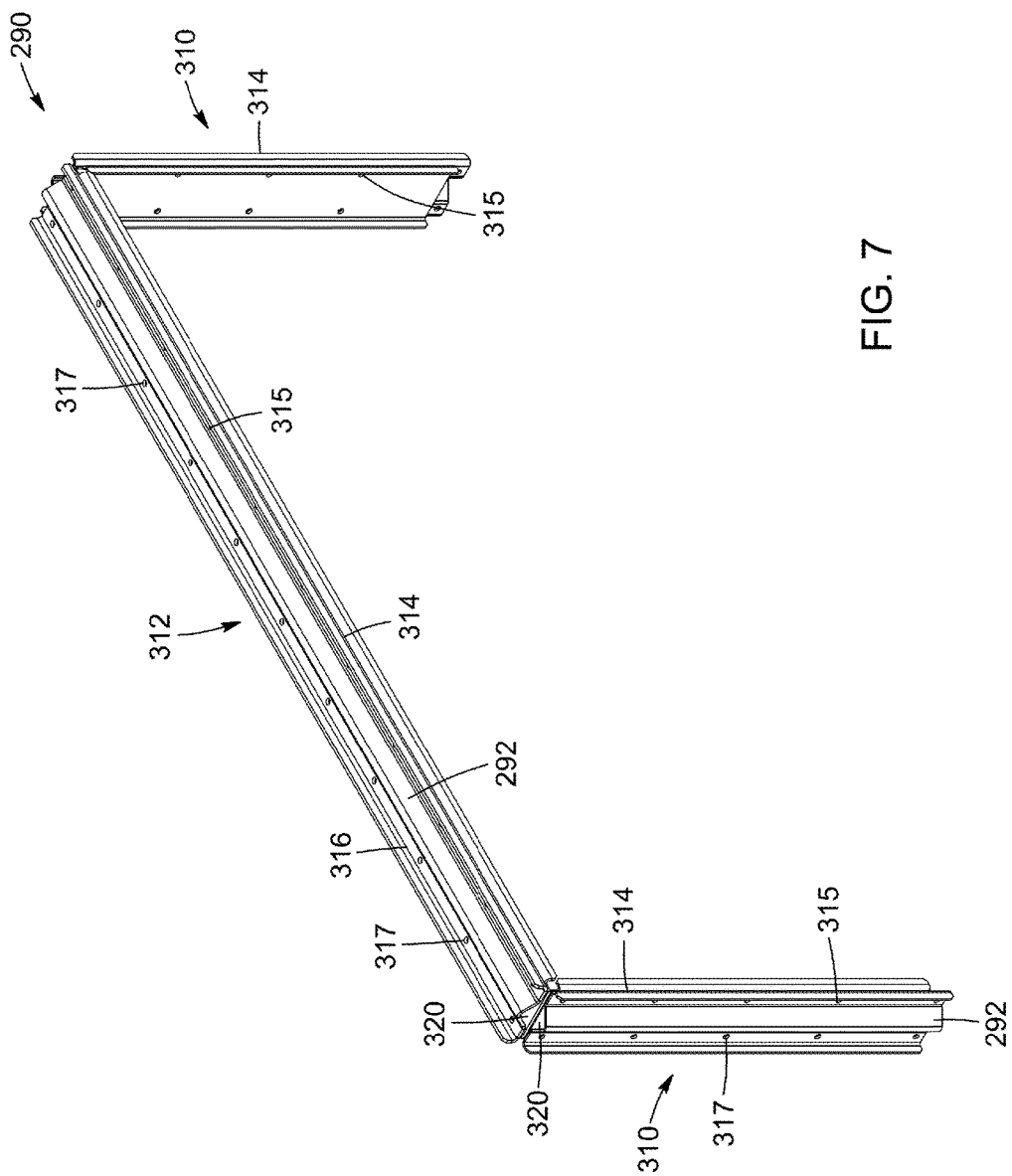
FIG. 7 illustrates a perspective view of a framing element according to an example embodiment.

Referring now to FIG. 7, therein illustrated is a U-shaped framing element 290 according to one example embodiment that may be used in combination with the U-shaped element 270 described herein. The framing element 290 includes opposing side portions 310 and a transverse portion 312 extending between the opposing side portions 310. A first rib 314 extends along a first edge of the framing element 290 to reinforce the framing element 290. A first set of fastener openings 315 may be formed along the first edge of the framing element 290, which may be used to attach the framing element 290 to a first U-shaped element 270. A second rib 316 extends along a second edge of the framing element 290 to reinforce the framing element 290. A second set of fastener openings 317 may be formed along the second edge of the framing element 290, which may be used to attach the framing element 290 to a second U-shaped element 270.

The framing element 290 may further include a central reinforcing element 292. As illustrated, the central reinforcing element 292 may extend centrally (i.e. between and parallelly to ribs 314 and 316) along the length of the framing element 290. The central reinforcing element 292 also provides reinforcement to the framing element 290. For example, and as illustrated, the reinforcing element 292 has the form of one or more rib members defining an open channel 320 beneath it.

The first rib 314, the second rib 316, and the reinforcing element 292, reinforce the framing element 290 and other components attached to that framing element 290 by increasing the structural rigidity of the framing element 290. For example, flexing of the side portions 310 and transverse portion 312 is reduced from the use of the reinforcing element 292.

Referring back to FIGS. 3 to 5, the illustrated example of the U-shaped element 270 is configured for being attached to the framing element 290 described herein with reference to FIG. 7. The U-shaped element 270 includes a first flange 322 extending along a first edge 324 thereof. As illustrated, the first flange 322 extends along the first edge 324 of the first and second sidewall members 272, 274 and the first edge 324 of the top wall member 288. A first set of fastener openings 326 is provided along the length of the first flange 322. A second set of fastener openings 328 is provided along the first and second sidewall members 272, 274 and the top wall member 288 in proximity of the first edge 324 thereof. Similarly, a second flange 332 extends along a second edge 334 of the U-shaped element 270. As illustrated, the second flange 332 extends along the second edge 334 of the first and second sidewall members 272, 274 and the second edge 334 of the top wall member 288. A third set of fastener openings 336 is provided along the length of the second flange 332. A fourth set of fastener openings 338 is provided along first and second sidewall members 272, 274 and the top wall member 288 in proximity of the second edge 334 thereof.

Figure 9:
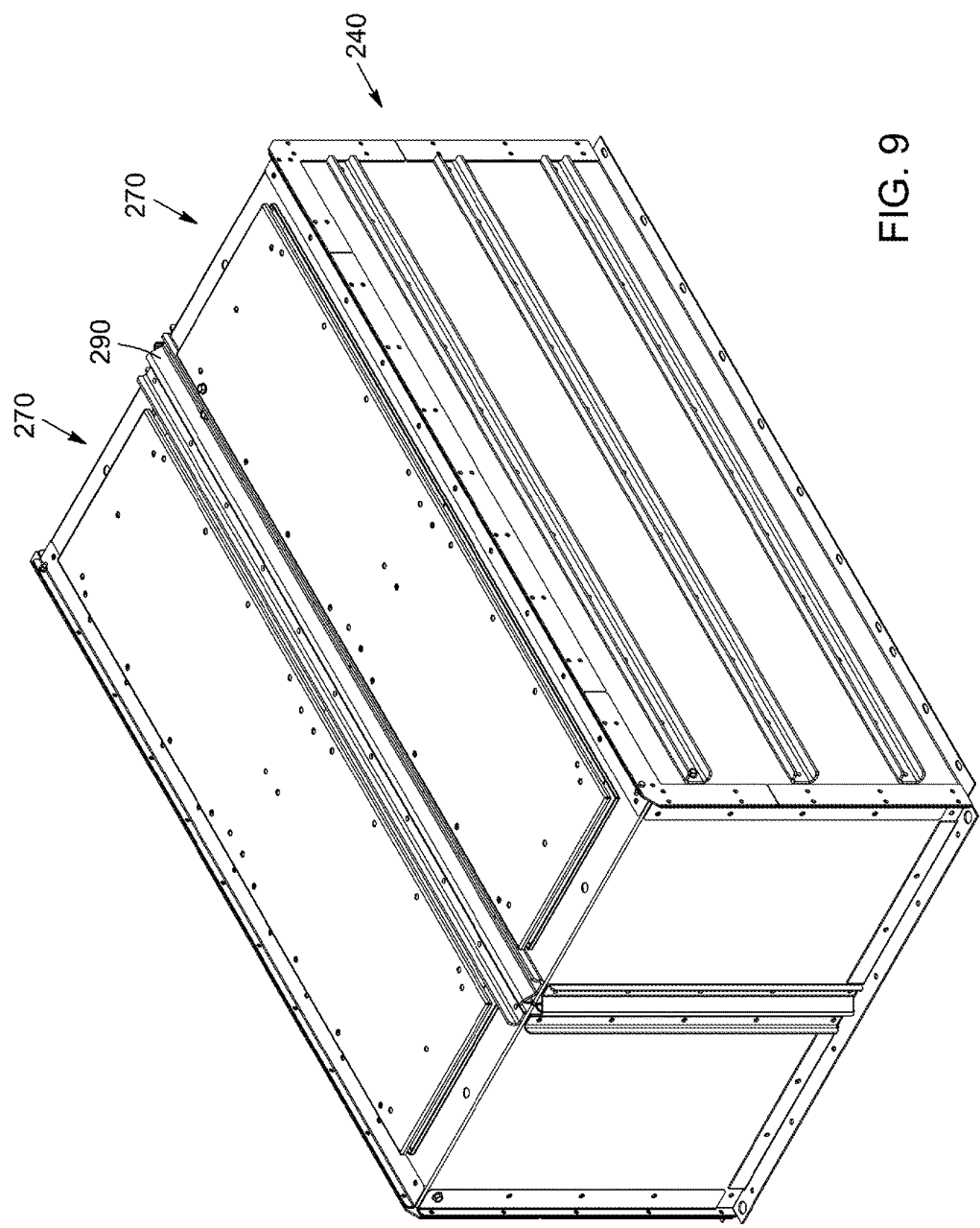
FIG. 9 illustrates a perspective view of two U-shaped elements being assembled together according to one example embodiment.

Referring now to FIG. 9, therein illustrated is a perspective view of two U-shaped elements 270 being assembled together using a framing element 290. The assembled U-shaped elements 270 may form a wholly assembled switchgear exhaust assembly 200 or may form only a portion of an assembled switchgear exhaust assembly. It will be appreciated that the use of U-shaped elements 270 allows the switchgear exhaust assembly 200 to be modular in that the size of the assembly 200 can vary according to the size of the switchgear 100 by changing the number of U-shaped elements 270 being used.

As illustrated in FIG. 9, the two U-shaped elements 270 are positioned adjacently such that the first flange 322 of a first of the U-shaped elements 270 interfaces with the second flange 332 of the second of the U-shaped elements 270. Suitable fasteners are inserted into the first set of fastener openings 326 of the first flange 322 of the first of the U-shaped elements 270 and the third set of fastener openings 336 of the second of the U-shaped elements 270 to provide a first set of connections between the two U-shaped elements 270.

The framing element 290 is then positioned over the interfacing between the first flange 322 of the first of the U-shaped elements 270 and the second flange 332 of the second of the U-shaped elements 270. The opposing side portions 310 of the framing element 290 extend along the sidewall members 272 and 274 of the U-shaped elements 270 and the transverse portion 312 extends along the top wall member 288 of the U-shaped elements 270.

The first rib 314 of the framing element 290 is aligned with the second edge 334 of the second of the U-shaped elements 270 and suitable fasteners are inserted into the first set of fastener openings 315 of the first rib 314 of the framing element 290 and the fourth set of fastener openings 338 of the second edge 334 of the second of the U-shaped elements 270. This forms an attachment between the framing element 290 and the second of the U-shaped elements 270.

Similarly, the second rib 316 of the framing element 290 is aligned with the first edge 324 of the first of the U-shaped elements 270 and suitable fasteners are inserted into the second set of fastener openings 317 of the second rib 316 of the framing element 290 and the second set of fastener openings 328 of the first edge 324 of the first of the U-shaped elements 270. This forms an attachment between the framing element 290 and the first of the U-shaped elements 270.

It will be appreciated that the first and second U-shaped elements 270 are attached directly to each other (through the attachment of respective flanges 322 and 332) and also via the framing element 290. It will be further appreciated that the framing element serves the dual purpose of reinforcing the U-shaped elements 270 attached to it, as well as ensuring an attachment of the U-shaped elements together.

Figure 8:
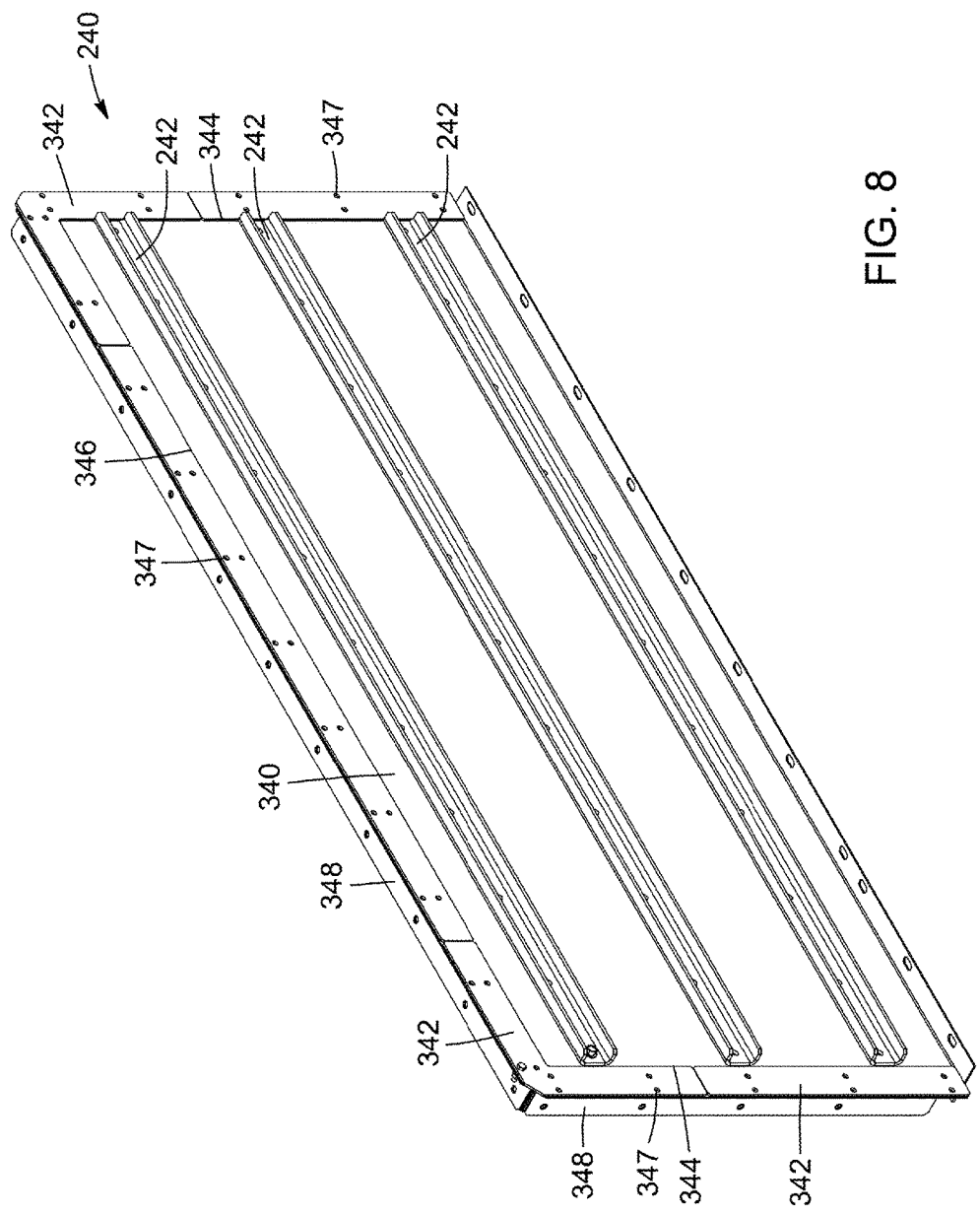
FIG. 8 illustrates a perspective view of an end sidewall of the enclosure according to one example embodiment.

Referring now to FIG. 8, therein illustrated is a perspective view of an end sidewall 240 according to one example embodiment that may be used in combination with the U-shaped element 270 described herein. The end sidewall 240 includes a wall body 340 which forms part of the enclosure 210 and partially defines the primary exhaust chamber 250 when attached to the U-shaped elements 270. For example, the wall body 340 may be a panel member formed of a suitable material, such as metal or steel.

For example, and as illustrated, one or more end wall reinforcing elements 242 may be provided along the surface of the wall body 340. The reinforcing elements 242, which may be elongated ribs fastened to the wall body 340, reinforce the wall body 340. The structural rigidity of the wall body 340 is increased and flexing of the wall body 340 under pressure is reduced.

For example, and as illustrated, the end sidewall 240 includes a first flange 342 extending outwardly from side edges 344 and top edge 346 of the end wall body 340. A first set of fastener openings 347 is formed along the length of the first flange 342. The end sidewall 240 further includes a second flange 348 extending transversely from a surface of the wall body 340. A second set of fastener openings 349 is formed along the length of the second flange 348.

Referring back to FIG. 9, the example assembly has the end sidewall 240 being attached to a first edge 324 of the second of the U-shaped elements 270. The first flange 322 interfaces with outwardly extending flange 342 of the end sidewall 240 and fasteners received in fastener openings 326 of the flange 322 and fastener openings 347 of the outwardly extending flange 342 attach the flanges 322, 342 together.

The second flange 348 of the end sidewall 240 extends over a region of the top wall member 288 along the first edge 324. Fasteners received in fastener openings 328 of the top wall member 288 and fastener openings 349 of the second flange 348 further attach the end sidewall 240 to the second of the U-shaped element 270.

It will be appreciated that a varying number of U-shaped elements 270 can be aligned edge to edge to form an enclosure 210 of different sizes. The first sidewall members 272 of the U-shaped elements 270 together form a first lateral sidewall 245 of the enclosure 210 and the second sidewall members 274 together form a second lateral sidewall 245 of the enclosure 210 and the panel assemblies 270 together form the top wall 230. Each panel assembly 270 can correspond to a top wall segment 235.

Referring now to FIGS. 10A, 10B, 10C, 10D, therein illustrated are close up view of the interfacing between switchgear exhaust assembly 200 and the switchgear 100 according to one example embodiment (end sidewalls 240 are omitted to show the inside of the primary exhaust chamber 250). One or more bracket members 360 are provided on a surface of the switchgear 100. The bracket members 360 form a first attachment with the surface of the switchgear 100. The bracket members 360 further form a second attachment with the bottom portions 362 of the lateral sidewalls 245 of the enclosure 210, thereby attaching the surface of the switchgear 100 with the enclosure 210. Existing switchgears 100 may be retrofitted with bracket members 360 to allow installation of the switchgear exhaust assembly 200. Alternatively, switchgears 100 may be manufactured to include the bracket members 360 to allow attachment thereto of the switchgear exhaust assembly 200 described herein.

According to a method for controlling flow of exhaust from one or more exhaust ports of a switchgear, the switchgear exhaust assembly 200 is installed to the switchgear 100 to substantially enclose the exhaust ports 102 of the switchgear 100. During an occurrence of an arc fault, exhaust flowing through the exhaust ports is captured within a primary exhaust chamber 250 of the enclosure 210. This captured exhaust expands and is cooled within the primary exhaust chamber 250.

A portion of the exhaust captured in the primary exhaust chamber 250 is channeled to a secondary exhaust chamber 260 of the enclosure 210. The secondary exhaust chamber 260 is positioned above the primary exhaust chamber 250 and is in fluid communication with it.

The portion of the exhaust received in the secondary exhaust chamber 260 is then expelled in a substantially sideways direction via side openings 236 of the secondary exhaust chamber 260 to the space surrounding the enclosure 210.

It was observed that, particularly in North-America, a commonly employed method of improving switchgear safety through arc-resistant construction is to provide a direct, vertical exhaust vent from each compartment at the top of the switchgear enclosure. However, venting the exhaust upwardly/vertically introduces the restriction that no objects, such as ceilings, pipes, ducts, conduits, wireways, or lights, can be located above the switchgear. For example, a minimum clearance of more than 2 meters above the switchgear may be required. Without such a clearance, these objects could deflect the hot gases vented by the equipment toward personnel or impede proper venting so that the equipment cannot perform as intended during an internal arcing fault. This minimum clearance can be a limitation for most new and existing installations.

Exhaust chambers or plenums for channeling the exhaust may be an alternative to the requirement for a minimum clearance of 2 meters. However, it was observed that for areas with cold temperatures, this alternative creates potential problems. The most common issue is the potential for condensation to form within the plenum (due to heat difference between the inside of the plenum with colder temperatures of the outdoor environment). Formation of condensation within the plenum creates a hazard to high and medium voltage equipment of the switch gear.

For such exhaust chambers and/or plenums, a vent cover is typically positioned between an exit of a duct of the plenum and the space outside the building. In areas with colder temperatures, ice can build up on the exterior of the vent cover, which can prevent the cover from opening to allow escape of exhaust, resulting in catastrophic failure of the switchgear inside the building. Insulation may be provided on the cover to restrict the buildup of ice, but this insulation adds weight to the vent cover and can hinder proper operation of the vent cover.

Advantageously, it was observed that the switchgear exhaust assembly 100 described herein according to various example embodiment is usable in room or other locations having objects that provide a low clearance above the switchgear 100. More particularly, due to the exhaust being expelled in a substantially sideways direction from the side openings 236, the amount of exhaust reaching and being deflected by objects located above the switchgear 100 is significantly reduced. Various computational fluid dynamics was used to simulate the flow of exhaust through the first and second chambers of the switchgear exhaust assembly 100 and the expelling of exhaust to the environment surrounding the assembly 100. Physical models of various switchgear exhaust assembly 100 were also constructed and subject to switchgear failures to test designs and validate the simulations.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A switchgear exhaust assembly mountable to a switchgear having one or more exhaust ports, for controlling flow of exhaust from the one or more exhaust ports of the switchgear, the assembly comprising:
    an enclosure having a plurality of walls, the plurality of walls including a top wall, the enclosure being couplable to the switchgear to substantially enclose the one or more exhaust ports of the switchgear, the enclosure defining a primary exhaust chamber for receiving exhaust exiting the switchgear through the exhaust ports thereof, the primary exhaust chamber being located downstream of the exhaust ports,
    the top wall having a top layer and a bottom layer defining at least one secondary exhaust chamber therebetween, the secondary exhaust chamber being located above the primary exhaust chamber and downstream of the primary exhaust chamber,
    the bottom layer of the top wall comprising first openings providing fluid communication between the primary exhaust chamber and the secondary exhaust chamber,
    the top layer and the bottom layer of the top wall defining one or more side openings therebetween, the side openings providing fluid communication between the secondary exhaust chamber and a space surrounding the enclosure, allowing exhaust to be expelled into said space;
    wherein the enclosure is substantially closed when mounted to the switchgear;
    wherein in an occurrence of an arc fault, gases of the exhaust exiting the switchgear through the exhaust ports and being received within the primary exhaust chamber expand and cool down within the primary exhaust chamber, the gases of the exhaust further passing through the first openings of the bottom layer into the secondary exhaust chamber wherein the gases are further cooled down, and the gases exit the enclosure only through the side openings in a substantially sideways direction;
    wherein the plurality of walls of the enclosure comprises opposing lateral sidewalls and opposing end sidewalls; and
    wherein the enclosure comprises at least one U-shaped element having opposing first and second sidewall members and a panel assembly extending therebetween, the first and second sidewall members corresponding to portions of the lateral sidewalls of the enclosure and the panel assembly corresponding to a portion of the top wall.

2. The switchgear exhaust assembly of claim 1, wherein the one or more side openings are defined along at least one edge of one of the top and bottom layers of the top wall.

3. The switchgear exhaust assembly of claim 1, wherein the top layer of the top wall is substantially free of openings therein.

4. The switchgear exhaust assembly of claim 1, wherein the first openings of the bottom layer are located remotely of the one or more side openings.

5. The switchgear exhaust assembly of claim 1, comprising a plurality of framing elements supporting the enclosure, for reinforcing the enclosure.

6. The switchgear exhaust assembly of claim 1, wherein the panel assembly comprises a bottom panel, a top panel and at least one perforated panel having a plurality of perforations corresponding to the first openings of the top wall, said at least one perforated panel being supported by the bottom panel.

7. The switchgear exhaust assembly of claim 6, wherein the panel assembly further comprises a top wall member extending between the opposing first and second sidewall members of the U-shaped element and supporting at least one of the top and bottom panels; and
    wherein the top panel corresponds to a portion of the top layer of the top wall and wherein the bottom panel, the perforated panel and the top sidewall of the U-shaped element correspond to a portion of the bottom layer of the top wall.

8. The switchgear exhaust assembly of claim 1, wherein the end sidewalls comprise at least one end wall reinforcing element, for reinforcing the end sidewalls.

9. The switchgear exhaust assembly of claim 1, comprising a plurality of spacing elements extending between the top and bottom panels of the panel assembly, for maintaining a space between the top and bottom panels and providing the secondary exhaust chamber therebetween.

10. A switchgear exhaust assembly for controlling flow of exhaust from one or more exhaust ports of a switchgear, the assembly comprising:
    an enclosure having a plurality of walls having a top wall, the enclosure being couplable to the switchgear to substantially enclose the one or more exhaust ports of the switchgear, the enclosure defining a primary exhaust chamber for receiving exhaust flowing through the exhaust ports and allowing gases of the exhaust to expand and cool down, the top wall having a top layer and a bottom layer defining at least one secondary exhaust chamber therebetween, the bottom layer of the top wall comprising first openings providing fluid communication between the primary exhaust chamber and the secondary exhaust chamber, the top layer and the bottom layer of the top wall defining one or more side openings therebetween, the side openings providing fluid communication between the secondary exhaust chamber and a space surrounding the enclosure, allowing exhaust to be expelled into said space;

wherein the plurality of walls of the enclosure comprises opposing lateral sidewalls and opposing end sidewalls; and wherein the enclosure comprises at least one U-shaped element having opposing first and second sidewall members and a panel assembly extending therebetween, the first and second sidewall members corresponding to portions of the lateral sidewalls of the enclosure and the panel assembly corresponding to a portion of the top wall;

wherein the panel assembly comprises a top panel having at least one first rim extending downwardly and a bottom panel having at least one second rim extending upwardly and facing said at least one first rim, the one or more side openings of the top wall being defined between said at least one first and second rims.

11. The switchgear exhaust assembly of claim 10, comprising a plurality of spacing elements extending between the top and bottom panels of the panel assembly, for maintaining a space between the top and bottom panels and providing the secondary exhaust chamber therebetween.

12. A switchgear exhaust assembly for controlling flow of exhaust from one or more exhaust ports of a switchgear, the assembly comprising:

an enclosure having a plurality of walls having a top wall, the enclosure being couplable to the switchgear to substantially enclose the one or more exhaust ports of the switchgear, the enclosure defining a primary exhaust chamber for receiving exhaust flowing through the exhaust ports and allowing gases of the exhaust to expand and cool down, the top wall having a top layer and a bottom layer defining at least one secondary exhaust chamber therebetween, the bottom layer of the top wall comprising first openings providing fluid communication between the primary exhaust chamber and the secondary exhaust chamber, the top layer and the bottom layer of the top wall defining one or more side openings therebetween, the side openings providing fluid communication between the secondary exhaust chamber and a space surrounding the enclosure, allowing exhaust to be expelled into said space;

wherein the plurality of walls of the enclosure comprises opposing lateral sidewalls and opposing end sidewalls, and wherein the enclosure comprises a plurality of U-shaped elements each having opposing first and second sidewall members and a panel assembly extending therebetween, the first and second sidewall members corresponding to portions of the lateral sidewalls of the enclosure and the panel assembly corresponding to a portion of the top wall;

wherein the U-shaped elements are aligned, the first sidewall members forming a first of the lateral sidewalls and the second sidewall members forming a second of the lateral sidewalls.

13. The switchgear exhaust assembly of claim 12, comprising at least one framing element each being positioned between a pair of adjacent U-shaped elements, for reinforcing the pair of adjacent U-shaped elements.

14. The switchgear exhaust assembly of claim 13, wherein the framing element further comprises at least one frame reinforcing element.

15. A switchgear exhaust assembly mountable to a switchgear having one or more exhaust ports, for controlling flow of exhaust from the one or more exhaust ports of the switchgear, the assembly comprising:

a plurality of U-shaped elements each having opposing first and second sidewall members and a panel assembly extending therebetween, the plurality of U-shaped elements being aligned whereby the first sidewall members form a first lateral sidewall, the second sidewall members form a second lateral sidewall, and the panel assemblies form a top wall;

a pair of opposing end sidewalls defining with the first lateral sidewall, the second lateral sidewall and the top wall, a primary exhaust chamber for receiving exhaust flowing through the exhaust ports and allowing gases of the exhaust to expand and cool down, the panel assembly of one or more of the plurality of the U-shaped elements each having a top layer and a bottom layer defining a respective secondary exhaust chamber therebetween, the bottom layer of the panel assembly comprising first openings providing fluid communication between the primary exhaust chamber and the respective secondary exhaust chambers, and the top layer and the bottom layer of the panel assembly defining one or more side openings therebetween, for providing fluid communication between the respective secondary exhaust chamber and a space surrounding the switchgear exhaust assembly, allowing gases to be expelled into said space; and at least one framing element each being positioned between a pair of adjacent U-shaped members, for reinforcing the pair of adjacent U-shaped members; and wherein the end sidewalls comprise at least one end wall reinforcing element, for reinforcing the end sidewalls.

16. The switchgear exhaust assembly of claim 15, wherein the panel assembly of the one or more of the U-shaped elements each comprises:

a top panel having at least one first rim extending downwardly and a bottom panel having at least one second rim extending upwardly and facing said at least one first rim, the one or more side openings of the top wall being defined between said at least one first and second rims; and a plurality of spacing elements extending between the top and bottom panels of the panel assembly, for maintaining a space between the top and bottom panels and providing the secondary exhaust chamber therebetween.

17. The switchgear exhaust assembly of claim 16, wherein the panel assembly of the one or more of the U-shaped elements each comprises:

at least one perforated panel having a plurality of perforations corresponding to the first openings of the top wall, said at least one perforated panel being supported by the bottom panel;

a top wall member extending between the opposing first and second sidewall members of the U-shaped element and supporting at least the top and bottom panels; and wherein the top panel corresponds to a portion of the top layer of the top wall and wherein the bottom panel, the perforated panel and the top wall of the U-shaped member correspond to a portion of the bottom layer of the top wall.

18. The switchgear exhaust assembly of claim 15, wherein the framing element further comprises at least one frame reinforcing element.

19. A method for controlling flow of exhaust from one or more exhaust ports of a switchgear, the method comprising:

in an occurrence of an arc fault, capturing exhaust flowing from the switchgear through the exhaust ports within a primary exhaust chamber of an enclosure mounted to the switchgear and being located downstream of the exhaust ports, gases of the exhaust expanding and being cooled in the primary exhaust chamber, the enclosure having a plurality of U-shaped elements each having opposing first and second sidewall members and a panel assembly extending therebetween, the plurality of U-shaped elements being aligned whereby the first sidewall members form a first lateral sidewall of the enclosure, the second sidewall members form a second lateral sidewall of the enclosure and the panel assemblies form a top wall of the enclosure, and the enclosure further having a pair of opposing end sidewalls defining with the first lateral sidewall, the second lateral sidewall and the top wall, the primary exhaust chamber;

channeling a portion of the gases of the exhaust to a secondary exhaust chamber of the enclosure, the secondary exhaust chamber being positioned above the primary exhaust chamber and being in fluid communication and downstream therewith, the portion of the gases further being cooled down, the panel assembly of one or more of the U-shaped elements having a top layer and a bottom layer defining the secondary exhaust chamber; and expelling the portion of the exhaust via side openings of the secondary exhaust chamber to a space surrounding the enclosure, the enclosure being substantially closed whereby the gases exit the enclosure only through the side openings in a substantially sideways direction.

* * * * *